United States Patent [19]

Inagaki

[11] Patent Number: 4,843,552
[45] Date of Patent: Jun. 27, 1989

[54] WHEEL SLIP CONTROL SYSTEM

[75] Inventor: Takafumi Inagaki, Toyota, Japan

[73] Assignee: Toyota Jidosha Kabushiki Kaisha, Japan

[21] Appl. No.: 869,372

[22] Filed: Jun. 2, 1986

[30] Foreign Application Priority Data

Jun. 8, 1985 [JP] Japan ................................ 60-124894

[51] Int. Cl.$^4$ ............................................... B60T 8/58
[52] U.S. Cl. ................... 364/426.03; 180/197; 303/103
[58] Field of Search .......... 364/426, 565, 571; 180/197; 361/238; 303/96, 98, 100, 103, 111

[56] References Cited

U.S. PATENT DOCUMENTS

| | | | |
|---|---|---|---|
| 3,779,331 | 12/1973 | Burckhardt et al. | 180/197 |
| 4,361,871 | 11/1982 | Miller et al. | 364/426 |
| 4,521,856 | 6/1985 | Phelps et al. | 364/426 |
| 4,566,737 | 1/1986 | Masaki et al. | 364/426 |
| 4,651,281 | 3/1987 | Masaki et al. | 364/426 |

Primary Examiner—Gary Chin
Attorney, Agent, or Firm—Parkhurst & Oliff

[57] ABSTRACT

A wheel slip control system is provided which includes a drive wheel speed detection device for detecting the speed of drive wheels driven by an internal combustion engine, a follower speed detection device for detecting the speed of follower wheels, a rotation difference computing device for computing the ratio of a detected value of the drive wheel speed detection device to a detected value of the follower speed detection device if the absolute change rate of the detection value of the drive wheel speed detection device is less than a fixed value, a drive wheel speed correction device for correcting a detected value of the drive wheel speed detection device using the wheel speed ratio computed by the rotation difference computing device, a slip determination device for determining if a slip is occurring by comparing the value of drive wheel speed corrected by the drive wheel speed correction device with the detected value of the follower speed detection device and an output power control for controlling the output power of the internal combustion engine according to the determination of the slip determination means.

8 Claims, 10 Drawing Sheets

WHEEL SLIP CONTROL SYSTEM

BACKGROUND OF THE INVENTION

The present invention relates to a wheel slip control system which controls the rotation of drive wheels to increase the frictional force between the drive wheels and the road surface, and more particularly to a wheel slip control system which controls the rotation of drive wheels by regulating the output power of an internal combustion engine.

Conventional wheel slip control systems control driving force to a maximum value by regulating a slip rate of drive wheels during acceleration. It is well-known that the maximum driving force is obtained when the slip rate S is approximately 10%, as shown in FIG. 2. The conventional slip control system compares drive wheel speed with follower wheel speed to determine if slip occurs during acceleration and, if slip is detected, reduces output power of an internal combustion engine.

In the abovementioned system, the difference between drive wheel speed and follower speed is used to determine the occurrence of slip. The ratio of the drive wheel speed to the follower speed should be constant when the vehicle drives at constant speed and does not slip. However, in an actual vehicle, the speed ratio usually constantly varies because of abrasion of the wheels, pneumatic pressure change or the like. Consequently, accurate slip control cannot be achieved in the prior art devices because the variable speed ratio is used as the basis for detecting slip.

SUMMARY OF THE INVENTION

Accordingly, one object of this invention is to provide a wheel slip control system which performs accurate slip control by determining the occurrence of slip with high accuracy even when the wheel speed ratio varies.

Another object of this invention is to provide a wheel slip control system which determines that slip occurs if the ratio of the corrected drive wheel speed, which is corrected by the wheel speed ratio obtained during constant speed driving, to the follower speed varies while slip control is performed, e.g. while a vehicle is accelerating, and reduces output power of an internal combustion engine.

A further object of this invention is to provide a wheel slip control system which corrects the wheel speed ratio used as the basis of the abovementioned judgment every time the vehicle is driven at a constant speed.

Still a further object of this invention is to provide the wheel slip control system which performs accurate slip control by means of correcting the ratio of drive wheel speed to follower speed every time the vehicle is driven at a constant speed even when the wheel speed ratio varies due to abrasion of wheels, pneumatic pressure change or the like.

In order to achieve these and other objects, the wheel slip control system of this invention includes a drive wheel speed detection means M2 for detecting the speed of drive wheels driven by an internal combustion engine M1, a follower speed detection means M3 for detecting the speed of follower wheels, a rotation difference computing means M4 for computing the ratio of a detected value of the drive wheel speed detection means M2 to a detected value of the follower speed detection means M3 if the absolute change rate of the detection value of the drive wheel speed detection means M2 is less than a fixed value, a drive wheel speed correction means M5 for correcting a detection value of the drive wheel speed detection means M2 making use of the wheel speed ratio computed by the rotational difference computing means M4, a slip determination means M6 for determining if a slip occurs by means of comparing the value of the drive wheel speed corrected by the drive wheel speed correction means M5 with the detected value of the follower speed detection means M3, and an output power control means M7 for controlling output power of the internal combustion engine M1 according to the determination of the slip determination means M6.

The drive wheel speed detection means M2 is a means for detecting the speed of drive wheels driven by the internal combustion engine M1. The drive wheel speed may be detected from a speed meter cable or the rotational speed of a drive shaft may be detected as the drive wheel speed. The follower speed detection means M3 is means for detecting the speed of follower wheels which are not driven by the internal combustion engine M1. For example, the number of flux of a magnetic field generated by a magnet attached on the follower wheels is detected by magnetic pickup as the follower speed. Since the left follower speed occasionally differs from the right follower speed, the speed of both follower wheels is detected and the mean value is calculated. The rotational difference computing means M4 computes the ratio of a detected value of the drive wheel speed detection means M2 to a detected value of the follower speed detection means M3 when the vehicle drives at a constant speed and does not slip. The ratio may be obtained as a voltage in response to the ratio of the detected values or in numeric form when a micro-computer is used. The drive wheel speed correction means M5 corrects a detected value of the drive wheel speed detection means M2 by multiplying the detected value by the computing ratio of the rotational difference computing means M4. The ratio of the corrected drive wheel speed to the detected value of the follower speed detection means M3 remains constant when the vehicle is driven at a constant speed and does not slip, and the ratio varies when the vehicle slips. The slip determination means M6 is a means for determining if slip occurs by using the ratio of the value of the drive wheel speed corrected by the drive wheel speed correction means M5 to the detected value of the follower speed detection means M3. This determination is performed by comparing the ratio of a corrected drive wheel speed to a detected follower speed while driving at a constant speed with the ratio of a corrected drive wheel speed to a detected follower speed during slip control. If these ratios are different from each other, the means M6 determines that slip is occuring. The output power control means M7 is a means for reducing the output power of the internal combustion engine M1 when the slip determination means M6 determines that the wheels are slipping. For reducing output power, for example, the amount of intake air or fuel supply is reduced or the ignition timing is delayed.

The method for controlling wheel slip using the abovementioned means is as follows.

The speed of drive wheels driven by the internal combustion engine M1 is detected by the drive wheel speed detection means M2.

The speed of follower wheels is detected by the follower speed detection means M3.

The ratio of the detected drive wheel speed to the detected follower speed is computed by the rotational difference computing means M4 during constant speed driving.

The detected drive wheel speed is corrected by the drive wheel speed correction means M5 using the wheel speed ratio during constant speed driving.

The ratio of the corrected drive wheel speed to the detected follower speed is used to determine if the wheels slip by the slip determination means M6.

The output power of the internal combustion engine M1 is controlled by the output power control means M7 according to the determination.

Accordingly, if the ratio of the corrected drive wheel speed to the follower speed obtained during constant speed driving varies during acceleration, it is determined that slip is occuring so that the output power of the internal combustion engine M1 is reduced.

BRIEF DESCRIPTION OF DRAWINGS

The above objects, features and advantages of the present invention will become more apparent from the description of the invention which follows, taken in conjunction with the accompanying drawings, wherein like reference numerals denote like elements, and wherein.

DETAILED DESCRIPTION OF PREFERRED EMBODIMENT

The present invention will be described in detail with reference to the accompanying drawings which illustrate a preferred embodiment according to the present invention.

Figure 1:
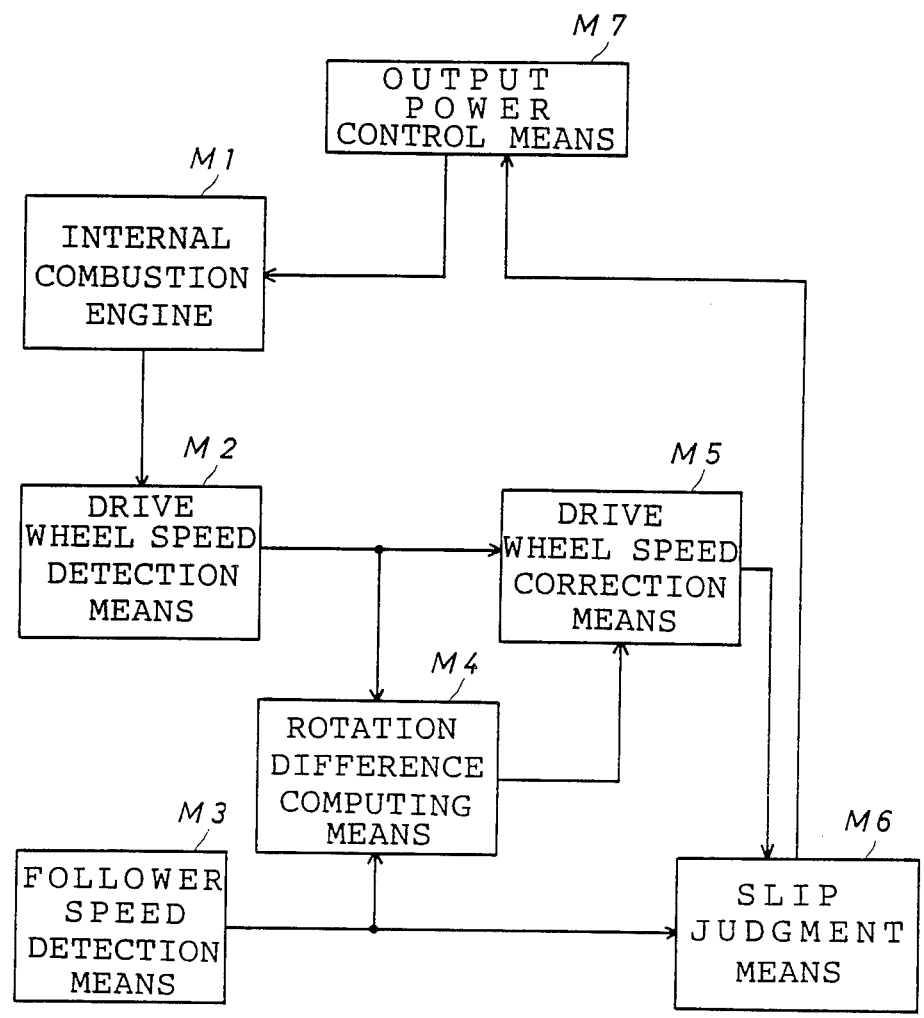
FIG. 1 illustrates a basic block diagram of a wheel slip control system according to this invention.
Figure 2:
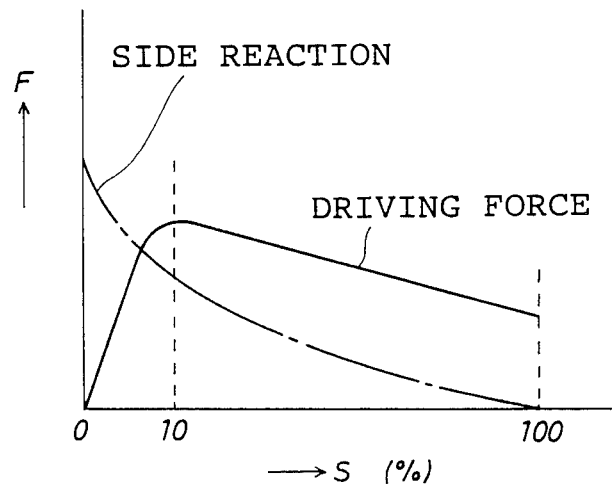
FIG. 2 is a diagram showing the relationship between the slip rate S and the driving force and the side force F during braking.
Figure 3:
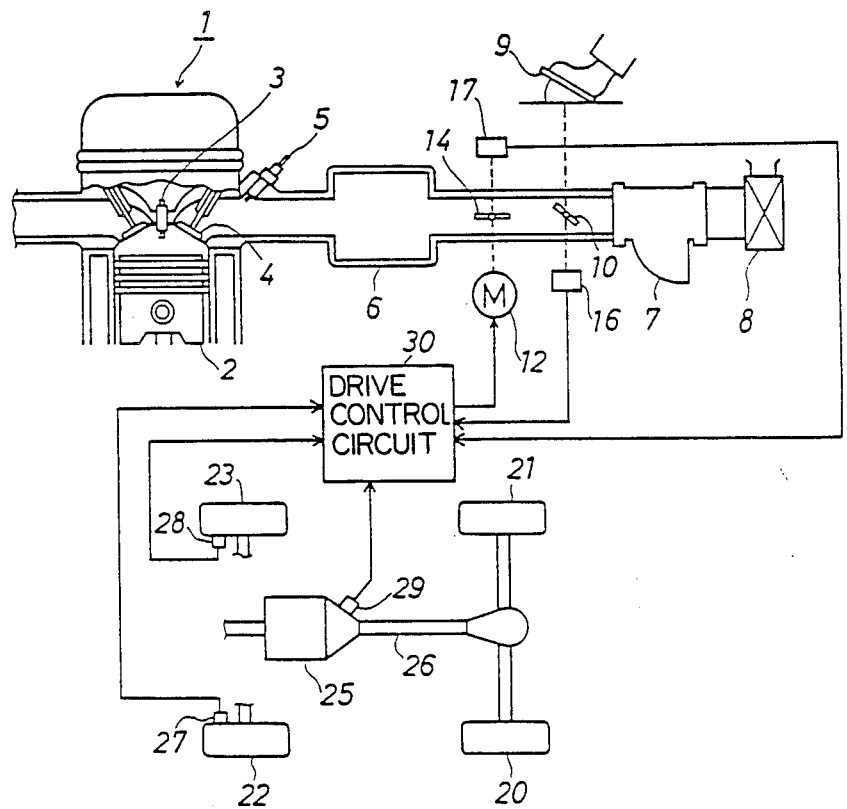
FIG. 3 is a schematic block diagram showing an engine including the wheel slip control system and wheel parts of an embodiment of this invention.

FIG. 3 illustrates an engine of a vehicle including a wheel slip control system and wheel parts. Numeral 1 designates an engine. Numeral 2 designates a piston. Numeral 3 denotes a spark plug. Numeral 4 denotes an intake valve. Numeral 5 shows a fuel injection valve. Numeral 6 denotes a surge tank. Numeral 7 shows an airflow meter. Numeral 8 shows an air cleaner. In this embodiment, a conventional main throttle valve 10 for controlling the amount of intake air which is interlocked with an accelerator 9 is provided and also a second throttle valve 14 controlled by DC motor 12 is provided for controlling the amount of intake air in a like manner to the main throttle valve 10. Both valves 10 and 14 are installed in the intake conduit between the airflow meter 7 and the surge tank 6. The main throttle valve 10 includes a main throttle opening sensor 16 for detecting the opening of valve 10, and the second throttle valve 14 includes a second throttle opening sensor 17 for detecting the opening of valve 14.

Numerals 20 thru 23 denote wheels of a vehicle. Numerals 20 and 21 show a left drive wheel and a right drive wheel, respectively. The drive wheels drive the vehicle using the power of the engine 1, which is transmitted via a transmission 25 and a propeller-shaft 26 to the drive wheels. Numerals 22 and 23 show a left follower wheel and a right follower wheel, respectively, which rotate as the vehicle is driven. The left follower wheel 22 and the right follower wheel 23 have follower wheel speed sensors 27 and 28, respectively, for detecting the speed of each follower wheel. The transmission 25 includes a drive wheel speed sensor 29 for detecting the mean speed of the left drive wheel 20 and the right drive wheel 21.

Numeral 30 denotes a drive control circuit. The circuit receives various detection signals sent from the main throttle opening sensor 16, the second throttle opening sensor 17, the left follower speed sensor 27, the right follower speed sensor 28 and the drive wheel speed sensor 29 and outputs a drive signal to the DC motor 12 controlling the opening of the second throttle valve 14 and thereby the engine power to prevent slippage of the wheels during acceleration so as to obtain maximum acceleration.

Figure 4:
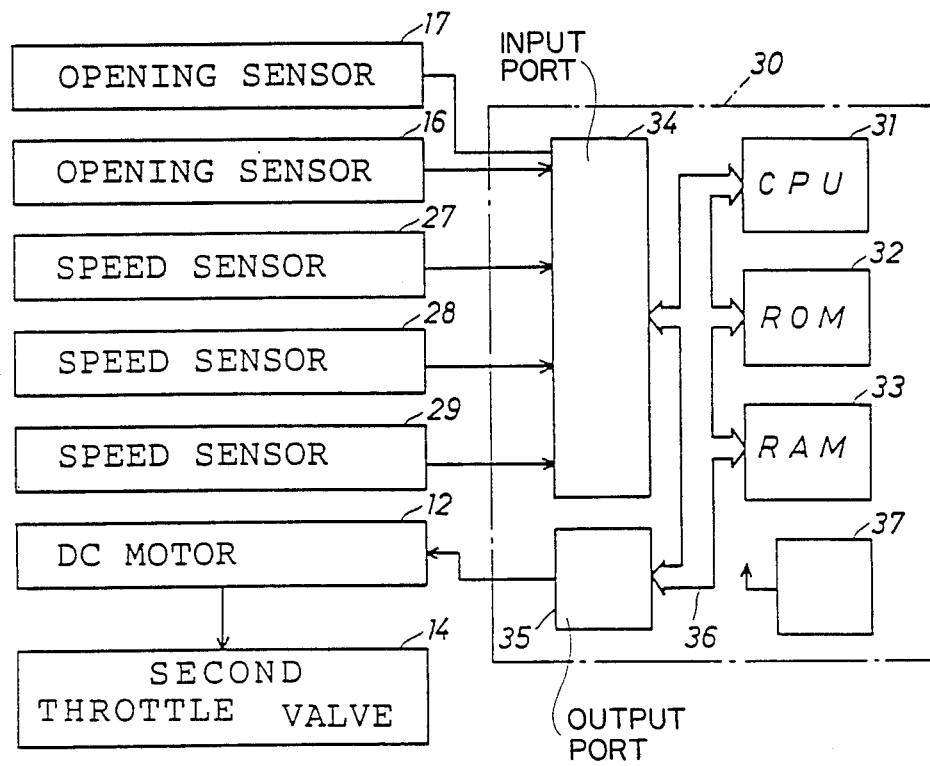
FIG. 4 is a block diagram showing the construction of the wheel slip control system of the embodiment.

In this embodiment, the drive control circuit 30 is constructed with the micro-computer shown in FIG. 4. Numeral 31 denotes the central processing unit hereinafter designated as CPU. The CPU enters and calculates data detected by each of the above-mentioned sensors, in accord with a control program and executes the process for controlling the DC motor 2. Numeral 32 shows a Read Only Memory hereinafter designated as ROM, which stores the control program or data such as tables. Numeral 33 denotes a Random Access Memory hereinafter designated as RAM, temporarily reading and writing the data sent from each sensor or the data required for calculation control. Numeral 34 shows an input port having a wave shave circuit and a multiplexer selectively outputting the output signal sent from each sensor to the CPU 31. Numeral 35 shows an output port having a drive circuit driving the DC motor 12 in accordance with the control signal from the CPU 31. Numeral 36 denotes a busline interconnecting each element such as the CPU 31 or ROM 32, the input port 34 and the output port 35 and being a passage for the data. Numeral 37 shows a power circuit which supplies power to each part described above.

Figure 5A:
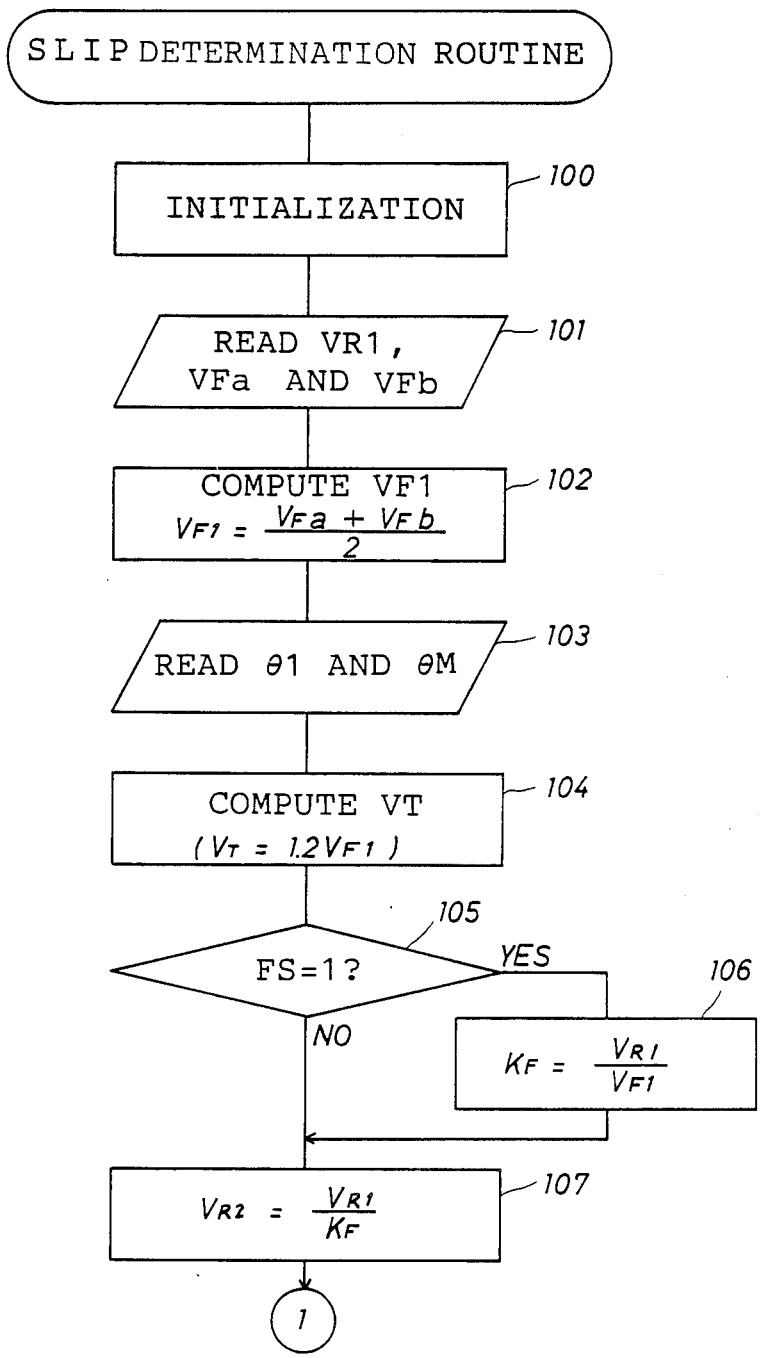
FIGS. 5A and 5B are flow charts of the slip determination routine executed by a drive control circuit 30 of FIG. 4 in the embodiment.
Figure 5B:
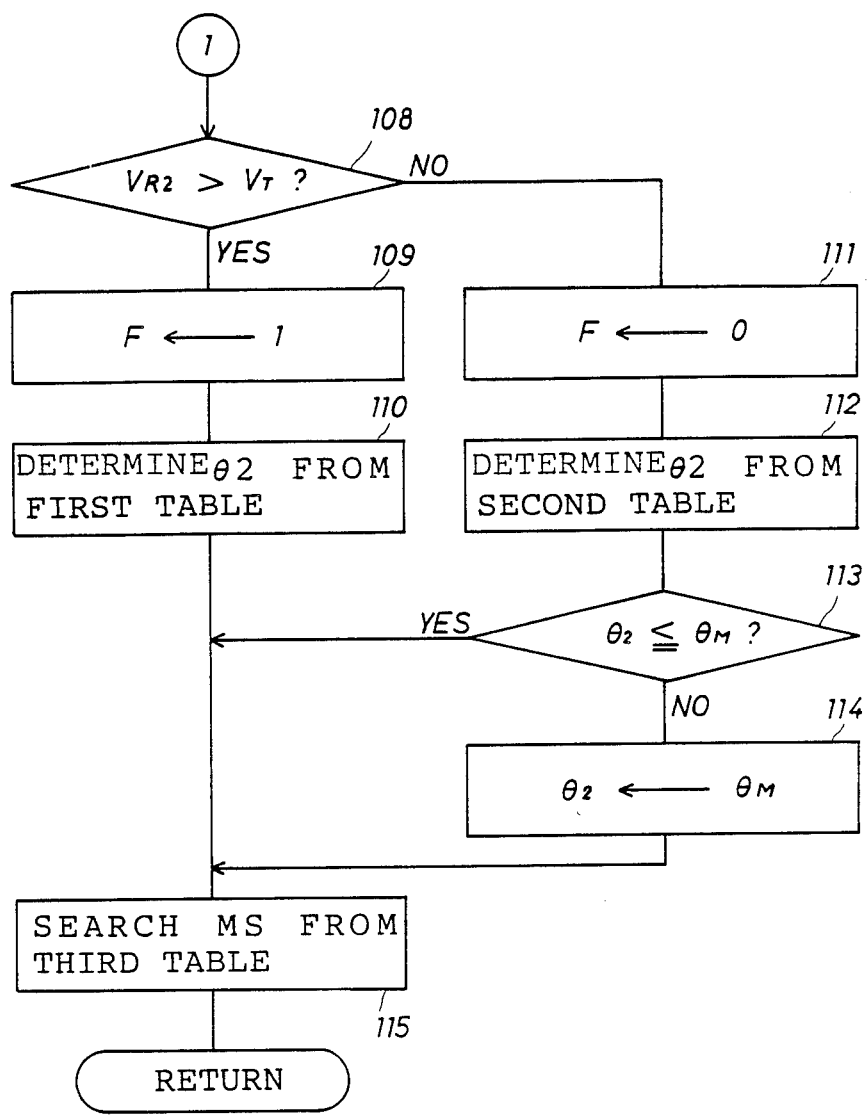

In the drive control circuit 30 constructed as described above, slip control is executed. Referring now to FIGS. 5A and 5B, the slip determination routine will be explained in detail.

At step 100, the computer provides for initialization of the system. For example, at this step, various constants are set and variables are reset to zero. The drive wheel speed VR1, the left follower speed VFa and the right follower speed VFb are read from the drive wheel speed sensor 29, the left follower speed sensor 27 and the right follower speed sensor 28, respectively, at step 101. The mean follower speed VF1 is computed from VFa and VFb in accordance with the equation $VF1=(VFa+VFb)/2$ at step 102. At step 103, the second throttle valve opening $\theta 1$ and the main throttle valve opening M are read from the second throttle opening sensor 17 and the main throttle opening sensor 16, respectively. At step 104, the reference wheel speed VT, which is the basis for determining whether the second throttle valve 14 is to open or to close, is computed, e.g. $VT=1.2 VF1$.

The program proceeds to decision point 105 where it is determined if a constant speed flag FS is set to 1. The constant speed flag FS is set to 1 during constant speed driving but is reset to zero during acceleration or deceleration in the constant speed judgment routine illustrated afterwards in FIG. 10. If FS is set to 1, the program proceeds to step 106, and if not, the program proceeds to step 107. At step 106, the rotation difference correction coefficient KF, which is the ratio of the drive wheel speed VR1 to the mean follower speed VF1 during constant speed driving, is computed in accordance with the equation $KF=VR1/VF1$.

Figure 6:
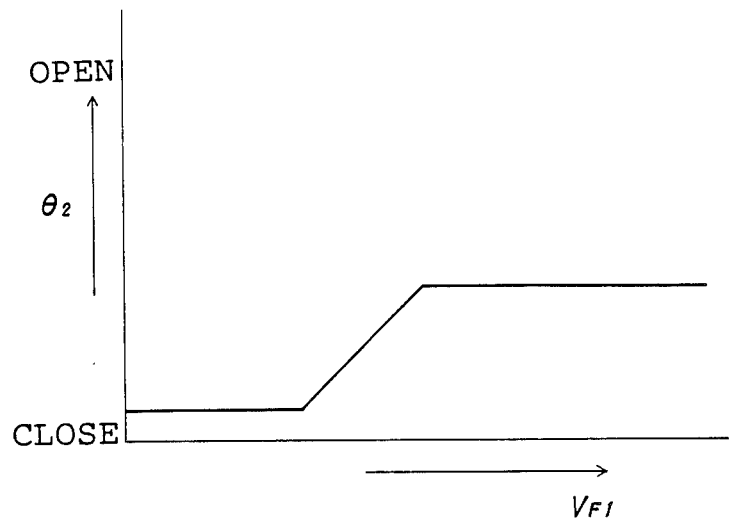
FIG. 6 is a diagram showing the relationship between VF1 and 2 in order to determine the target second throttle valve opening 2 used in the slip determination routine of FIG. 5.
Figure 7:
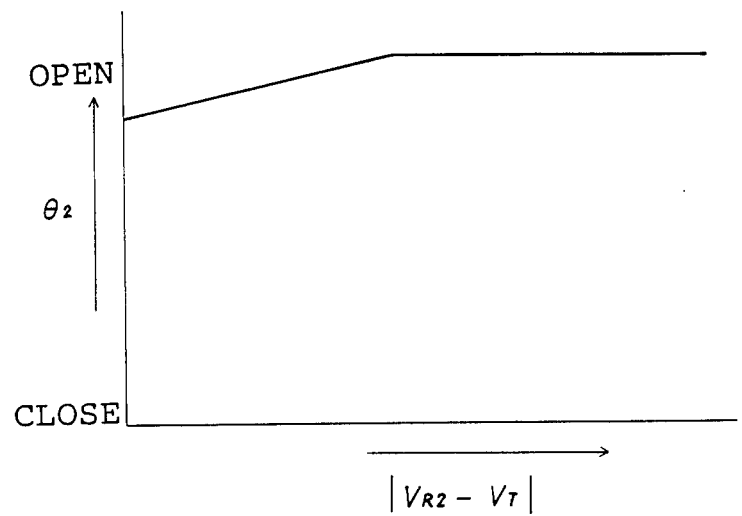
FIG. 7 is a diagram showing the relationship between $|VR2-VT|$ and 2.
Figure 8:
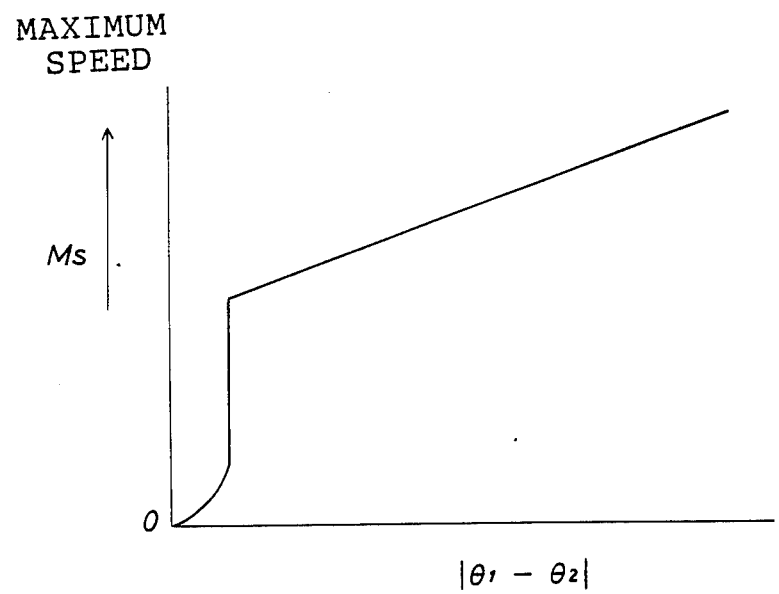
FIG. 8 is a diagram showing the relationship between $|\theta 1-\theta 2|$ and MS in order to determine the target motor speed MS.

Step 107 is a step for computing the corrected drive wheel speed VR2 in accord with the equation $VR2=VR1/KF$. VR2 is computed to equalize the speed VR2 corrected from the detected drive wheel speed VR1 with the follower speed VF1. Then the program proceeds to decision point 108 where VR2 computed at step 107 is compared with the reference wheel speed VT. If VR2 is greater than VT, the program proceeds to step 109, and if not, the program proceeds to step 111. At step 109, a slip flag F is set to 1 and at step 111, the slip flag F is reset to zero. After the flag is set to 1 at step 109, the program proceeds to step 110 where the target second throttle valve opening $\theta 2$ is determined from the first table showing the relationship between VF1 and $\theta 2$ illustrated in FIG. 6. After the flag is reset to zero at step 111, the program proceeds to step 112 where the target second throttle valve opening $\theta 2$ is determined from the second table showing the relationship between $|VR2-VT|$ and $\theta 2$ illustrated in FIG. 7. At step 113, the target opening $\theta 2$ is compared with the main throttle valve opening $\theta M$. If $\theta 2$ is less than or equal to $\theta M$, the program proceeds to step 115, and if not, the program proceeds to step 114. Step 114 is a step for substituting the value of $\theta M$ in $\theta 2$ so that the target second throttle valve opening $\theta 2$ does not exceed the main throttle valve opening $\theta M$. After substitution at step 114, the program proceeds to step 115. At step 115, the motor speed MS of the DC motor 12 showing open valve speed or close valve speed of the second throttle valve 14 is determined from the third table showing the relationship between $|\theta 1-\theta 2|$ and MS illustrated in FIG. 8. After execution of step 115, the routine is concluded once.

Accordingly, in this routine, the rotation difference correction coefficient KF is computed using the drive wheel speed VR1 and the follower speed VF1 while the vehicle drives at constant speed and does not slip. The corrected drive wheel speed VR2 is computed by correcting the drive wheel speed VR1 by the rotation difference correction coefficient KF. The slip rate of the drive wheels are controlled around a fixed value, e.g. the fixed value is 20% in this embodiment, by means of comparing VR2 with the reference wheel speed VT.

In this routine, if the slip rate is greater than the fixed value, the slip flag F is set to 1 and if not, F is reset to zero so that the second throttle valve 14 is controlled to open or to close. At steps 110 and 112, the target second throttle valve opening $\theta 2$ is determined and at step 115, the speed of opening and closing of the second throttle valve 14 is determined.

Figure 9:
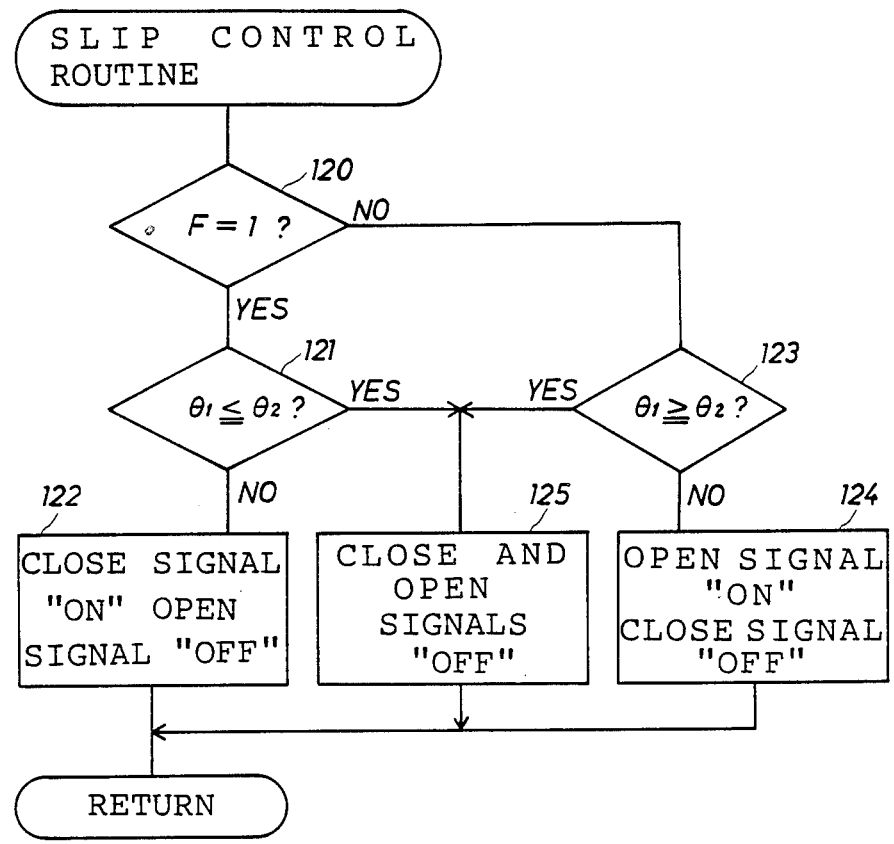
FIG. 9 is a flow chart of the slip control routine in the embodiment.

Referring to FIG. 9, the slip control routine will be explained. This routine is a routine for controlling the opening or closing of the second throttle valve 14 by means of the slip flag F, which is set or reset in the slip determination routine of FIG. 5. The routine starts from a decision point 120 where it is determined if the slip flag F is equal to 1. If the slip flag F is equal to 1, the program proceeds to step 121 and if not, the program proceeds to step 123. At step 121, the second throttle valve opening $\theta 1$ is compared with the target second throttle valve opening $\theta 2$. If $\theta 1$ is less than or equal to $\theta 2$, the program proceeds to step 125 and if not, the program proceeds to step 122. When the slip flag F is not equal to 1 at step 120, the second throttle valve opening $\theta 1$ is compared with the target second throttle valve opening $\theta 2$ at step 123. If $\theta 1$ is greater than or equal to $\theta 2$, the program proceeds to step 125 and if not, the program proceeds to step 124.

At step 122, a second throttle valve open signal, which is a signal for opening the second throttle valve 14, is "off" and a close valve signal is "on". At step 124, the second throttle valve open signal is "on" and the close valve signal is "off". At step 125, both of the open valve signal and the close valve signal are "off". After execution of the steps, this routine is concluded once.

Accordingly, in this routine, while the slip flag F is equal to 1, i.e. while the slip rate is greater than a fixed value, the close valve signal is outputted until the second throttle valve opening $\theta 1$ becomes equal to the target second throttle valve opening $\theta 2$. While F is equal to zero, the open valve signal is outputted until $\theta 1$ equals to $\theta 2$.

Figure 10:
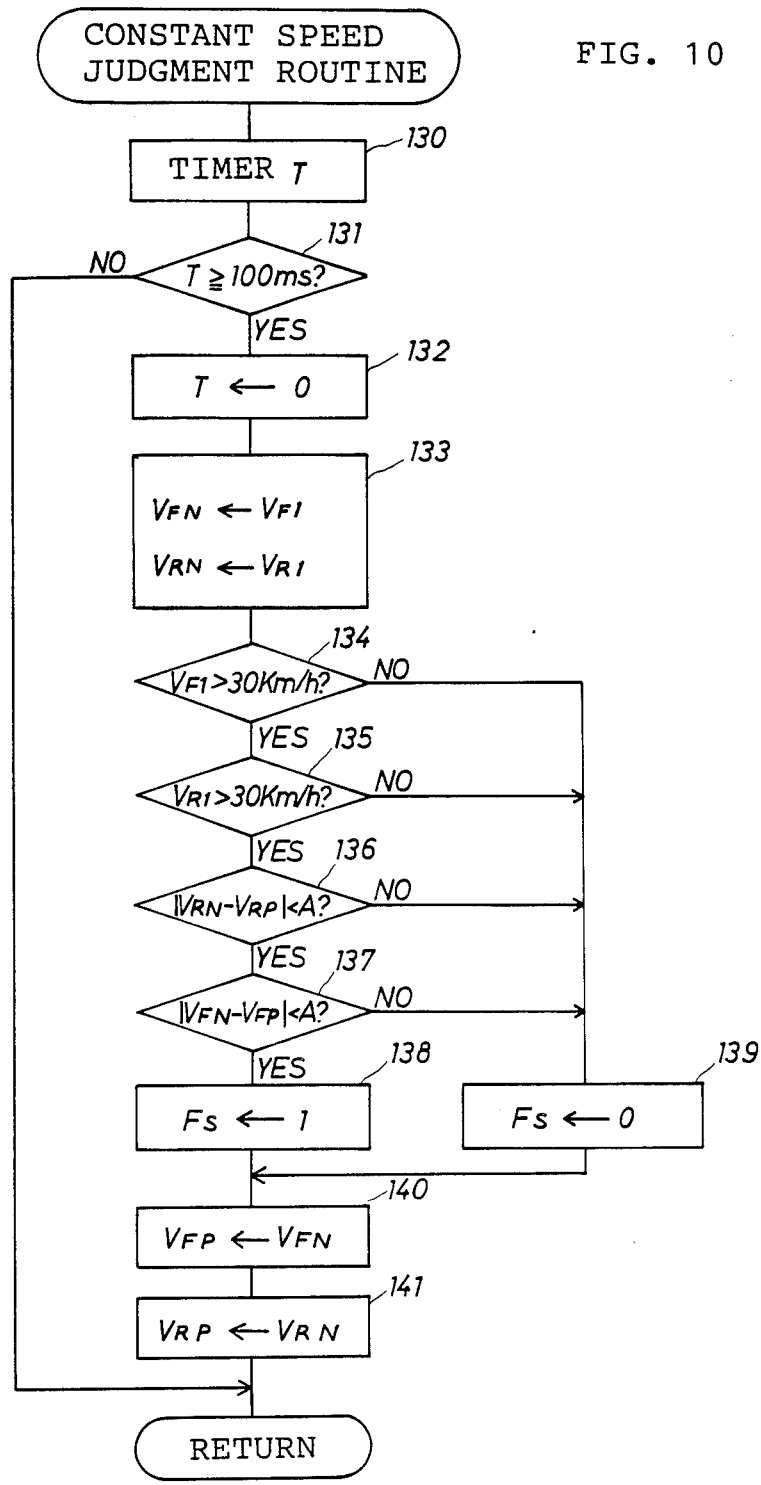
FIG. 10 is a flow chart of the constant speed judgment routine in the embodiment.

Referring now to FIG. 10, the constant speed judgment routine will be explained in detail. This routine is a routine for setting or resetting the constant speed flag FS which is a basis for determining if the rotation difference correction coefficient KF is to be computed.

Step 130 is a timer T. The timer T measures time by dividing or integrating the control clock used in the CPU 31. The routine proceeds to a decision point 131 where the timer T is compared with a fixed value. In this embodiment, the fixed value is equal to 100 (ms), but, of course, it may be fixed voluntarily. If T is greater than or equal to 100 (ms), the program proceeds to step 132 where the timer T is reset, and if not, the program exits from this routine.

Step 133 is a step for inputting the follower speed VF1 into the follower N memory VFN and the drive wheel speed VR1 into the drive wheel N memory VRN. At step 134, the follower speed VF1 is compared with 30 (Km/h). If VF1 is greater than 30 (Km/h), the program proceeds to step 135 and if not, the program proceeds to step 139 where the constant speed flag FS is reset to zero. At step 135, the drive wheel speed VR1 is compared with 30 (km/h). If VR1 is greater than 30 (km/h), the program proceeds to step 136 and if not, program proceeds to step 139. Step 136 is a step for comparing the absolute difference between the value of VRN and the value of VRP with a prescribed value A. In the drive wheel N memory VRN, the present drive wheel speed VR1 is stored at step 133 and in the drive wheel P memory VRP, the former value of VRN which was substituted in VRP at step 141 as explained afterwards during prior execution of this routine, i.e. 100 (ms) ago, is stored. A is set to the value of the speed difference which prevents slip. If the absolute difference between VRN and VRP is less than the prescribed value A at step 136, the program proceeds to step 137 and if not, the program proceeds to step 139. At step 137, the absolute difference between the value of the follower N memory VFN and the value of the follower P memory VFP is compared with the prescribed value A, in same manner as step 136. If the absolute difference is less than A, the program proceeds to step 138 and if not, the program proceeds to step 139.

At step 138, the constant speed flag FS is set to 1 and at step 139, the flag FS is reset to zero. After the flag FS is set or reset at step 138 or 139, the program proceeds to step 140 where the value of the follower N memory VFN is stored in the follower P memory VFP. At step 141, the value of the drive wheel N memory VRN is stored in the drive wheel P memory VRP. After execution of the steps, the routine is concluded once.

Accordingly, this routine judges every 100 (ms) whether or not a vehicle drives at constant speed. In this routine, it is determined if the drive wheel speed and the follower speed are greater than 30 (Km/h), respectively. The former drive wheel speed and follower speed, i.e. 100 (ms) ago, are compared with the present drive wheel speed and follower speed, respectively. Each absolute difference is compared with the prescribed speed difference A. When all of the results of the determination at each decision point are "YES", it is determined that the vehicle is driving at a constant speed and the constant speed flag FS is set to 1. Otherwise the flag FS is reset to zero.

In this embodiment, the slip control is performed by controlling the second throttle valve 14 to control the output power of the internal conbustion engine 1. The value for determining slip occurrence and degree, i.e. the corrected drive wheel speed VR2, is obtained by correcting the drive wheel speed by the rotation difference correction coefficient KF, which is computed from the follower speed and the drive wheel speed during constant speed driving. In this embodiment, it is determined that a vehicle drives at constant speed only when all conditions, such that the absolute change rate of the drive wheel speed and that of the follower speed are less than a prescribed value and both of the drive wheel speed and the follower speed are greater than 30 (Km/h) are satisfied. Although all of the above conditions are not necessary for this determination, the accuracy of the determination is improved by satisfying all of the above mentioned conditions.

Since the corrected drive wheel speed VR2 is used for the slip determination, the drive wheel speed is compared with the follower speed during constant speed driving without being affected by the change of the wheel diameter or the like. Consequently, the slip is detected by varying the relation between the drive wheel speed and the follower speed. The variation is always in proportion to the degree of the slip and is not affected by the change of the wheel diameter so that the accurate degree of the slip can be easily detected.

Furthermore, in this embodiment, as the target second throttle valve opening is determined from a table, the speed difference under abnormal conditions such as a flat tire is not corrected beyond demand. The optimum opening and closing speed of the second throttle valve is also determined from a table so that there are no problems such as abrupt change of the second throttle valve or delay in the opening or closing of the valve.

Accordingly, in this embodiment, the accurate degree of slip is used for the slip control so that the optimum and accurate slip control can be performed, even if the wheel diameter is changed.

What is claimed is:

1. A wheel slip control system comprising:
    a drive wheel speed detection means for detecting a speed of drive wheels;
    a follower speed detection means for detecting a speed of non-driven follower wheels;
    a rotation difference computing means for computing the ratio of a detected value of said drive wheel speed detection means to a detected value of said follower speed detection means during a steady state running condition;
    a drive wheel speed correction means for correcting said detected value of said drive wheel speed detection means using said wheel speed ratio determined by said rotation difference computing means;
    a slip determination means for determining if slippage of said drive wheels is occurring by comparing the value of the drive wheel speed corrected by said drive wheel speed correction means with a value based on the detected value of said follower speed detection means; and
    an output power control means for improving traction output according to the determination of said slip determination means when the vehicle is in a non-steady state running condition.

2. The wheel slip control system according to claim 1, wherein said slip determination means determines that a vehicle slips if the corrected value of drive wheel speed is greater than the detected value of follower speed, and determines that a vehicle does not slip if the corrected value of drive wheel is less than the detected value of follower speed.

3. The wheel slip control system according to claim 1, wherein said output power control means controls the output power of an internal combustion engine in response to the difference between the corrected value of the drive wheel speed and the detected value of the follower speed.

4. The wheel slip control system according to claim 1, wherein said output power control means controls the amount of intake air.

5. The wheel slip control system according to claim 1, wherein said rotation difference computing means determines that a vehicle drives at constant speed if an absolute value of said detected value of drive wheel speed is less than a fixed value.

6. The wheel slip control system according to claim 1, wherein said rotation difference computing means computes said ratio when an absolute value of the detected value of said drive wheel detection means is less than a fixed value.

7. The wheel slip control system according to claim 1, wherein said output power control means controls output power of an internal combustion engine.

8. A wheel slip control system comprising:
    a drive wheel speed detection means for detecting a speed of drive wheels driven by an internal combustion engine;
    a follower speed detection means for detecting a speed of non-driven follower wheels;

a rotation difference computing means for computing the ratio of a detected value of said drive wheel speed detection means to a detected value of said follower speed detection means when the absolute value of the detected value of said drive wheel speed detection means is less than a fixed value;

a drive wheel speed correction means for correcting said detected value of said drive wheel speed detection means using said wheel speed ratio determined by said rotation difference computing means;

a slip determination means for determining that slippage of said drive wheels is occurring if the value of the drive wheel speed corrected by said drive wheel speed correction means is different than a value based on the detected value of said follower speed detection means; and an output power control means for controlling output power of the internal combustion engine according to the determination of said slip determination means.

* * * * *